US012683226B2

(12) United States Patent
Ahn

(10) Patent No.: US 12,683,226 B2
(45) Date of Patent: Jul. 14, 2026

(54) POUCH-TYPE SECONDARY BATTERY WITH EXCELLENT INSULATION AND HEAT-DISSIPATING PROPERTIES

(71) Applicant: LG Energy Solution, Ltd., Seoul (KR)

(72) Inventor: Chang Bum Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 440 days.

(21) Appl. No.: 18/270,134

(22) PCT Filed: Aug. 22, 2022

(86) PCT No.: PCT/KR2022/012497
§ 371 (c)(1),
(2) Date: Jun. 28, 2023

(87) PCT Pub. No.: WO2023/033429
PCT Pub. Date: Mar. 9, 2023

(65) Prior Publication Data
US 2024/0072353 A1     Feb. 29, 2024

(30) Foreign Application Priority Data

Aug. 31, 2021     (KR) ........................ 10-2021-0115869
Jul. 18, 2022     (KR) ........................ 10-2022-0088456

(51) Int. Cl.
H01M 50/24          (2021.01)
H01M 10/647          (2014.01)
(Continued)

(52) U.S. Cl.
CPC ......... H01M 50/24 (2021.01); H01M 10/647 (2015.04); H01M 10/651 (2015.04);
(Continued)

(58) Field of Classification Search
None
See application file for complete search history.

(56) References Cited

U.S. PATENT DOCUMENTS

2013/0216896 A1* 8/2013 Kim .................... H01M 50/124
                                                          429/163
2013/0230767 A1* 9/2013 Pak ..................... H01M 50/171
                                                          29/623.2
(Continued)

FOREIGN PATENT DOCUMENTS

CN          201898124 U     7/2011
CN          103214897 A     7/2013
(Continued)

OTHER PUBLICATIONS

Extended European Search Report including Written Opinion for Application No. 22864933.1 dated Sep. 2, 2024. 8 pgs.
(Continued)

*Primary Examiner* — Scott J. Chmielecki
(74) *Attorney, Agent, or Firm* — Lerner David LLP

(57) ABSTRACT

A pouch type secondary battery includes a pouch type battery case including an electrode assembly housing portion and a sealing portion. An electrode assembly is housed in the housing portion, and an insulation coating layer is laminated on the sealing portion. The insulation coating layer includes a binder and heat-dissipating particles having a thermal conductivity of 0.2 W/(mk) or more.

14 Claims, 5 Drawing Sheets

(51) Int. Cl.

|  |  |
|---|---|
| *H01M 10/651* | (2014.01) |
| *H01M 10/653* | (2014.01) |
| *H01M 50/105* | (2021.01) |
| *H01M 50/184* | (2021.01) |

(52) U.S. Cl.
CPC ....... *H01M 10/653* (2015.04); *H01M 50/105* (2021.01); *H01M 50/184* (2021.01)

(56) References Cited

U.S. PATENT DOCUMENTS

| 2017/0194606 A1* | 7/2017 | Lim .................... H01M 50/578 |
|---|---|---|
| 2018/0254533 A1* | 9/2018 | Nam ................... H01M 10/647 |

FOREIGN PATENT DOCUMENTS

| CN | 207320201 U | 5/2018 |
|---|---|---|
| CN | 210349956 U | 4/2020 |
| CN | 112448070 A | 3/2021 |
| JP | 2007335309 A | 12/2007 |
| JP | 2012212592 A | 11/2012 |
| JP | 2019067608 A | 4/2019 |
| KR | 100918408 B1 | 9/2009 |
| KR | 101216422 B1 | 12/2012 |
| KR | 20130094638 A | 8/2013 |
| KR | 20150075732 A | 7/2015 |
| KR | 20160076245 A | 6/2016 |
| KR | 101675929 B1 | 11/2016 |
| KR | 20170070469 A | 6/2017 |
| KR | 20170135490 A | 12/2017 |
| KR | 20200038134 A | 4/2020 |
| KR | 102264633 B1 | 6/2021 |

OTHER PUBLICATIONS

International Search Report for Application No. PCT/KR2022/012497 mailed Nov. 18, 2022. 3 pages.

Search Report dated May 19, 2026 from the Office Action for Chinese Application No. 202280008458.4 issued May 20, 2026, pp. 1-3.

* cited by examiner

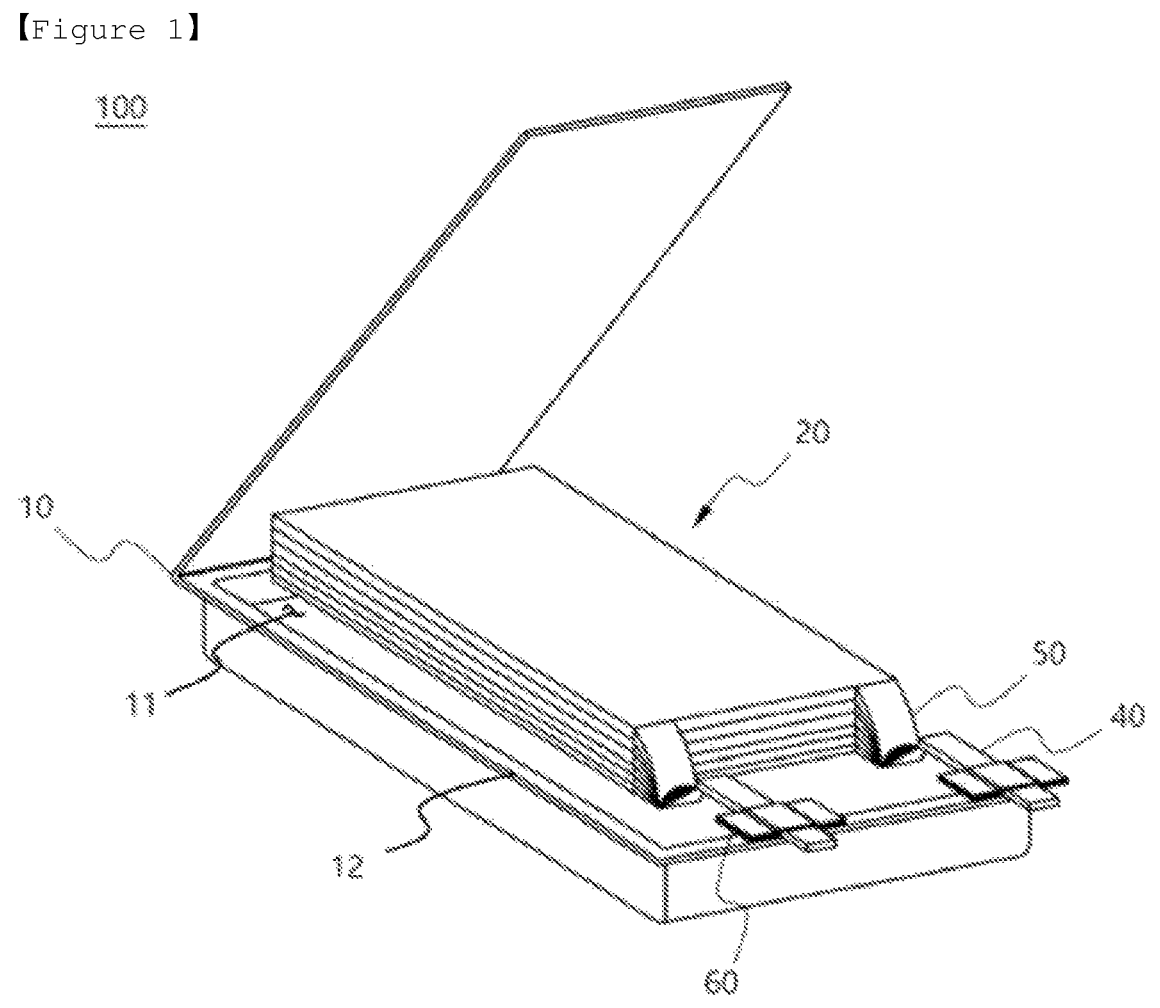

【Figure 1】

【Figure 2】
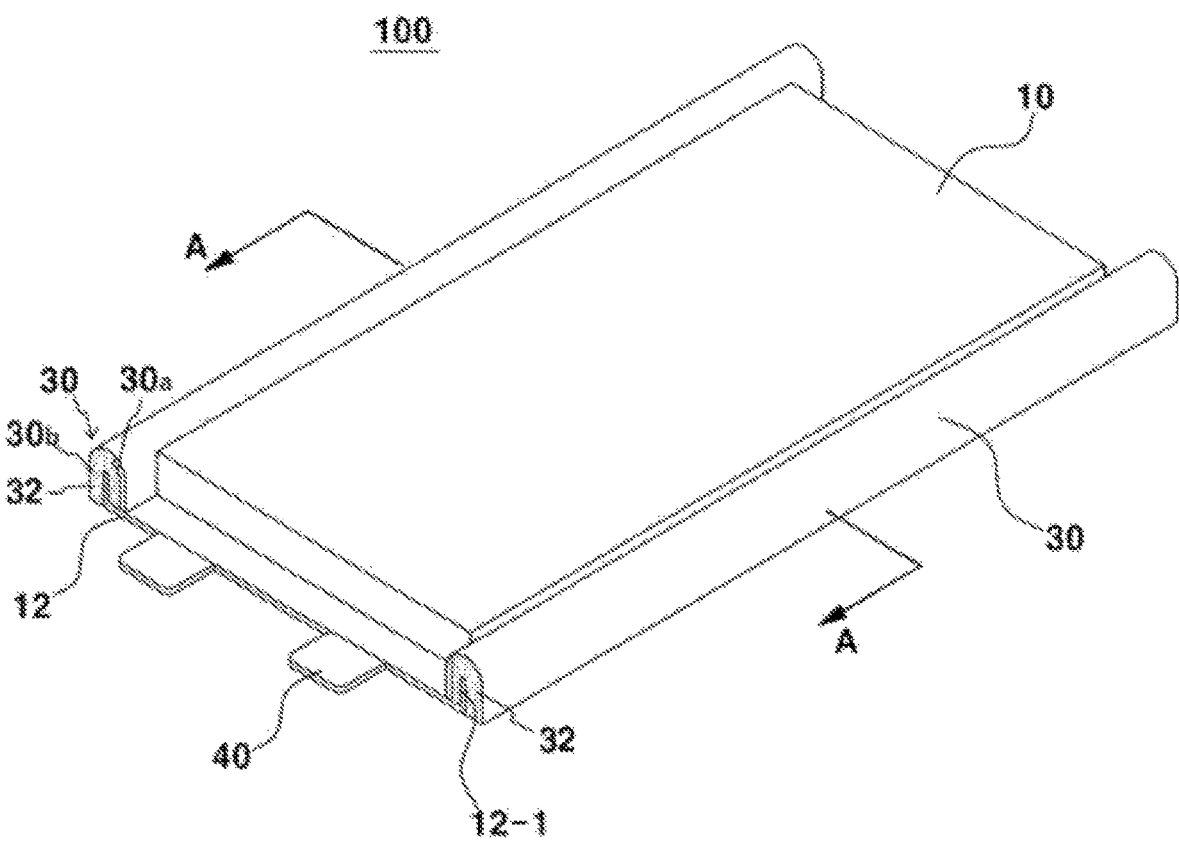
【Figure 3】
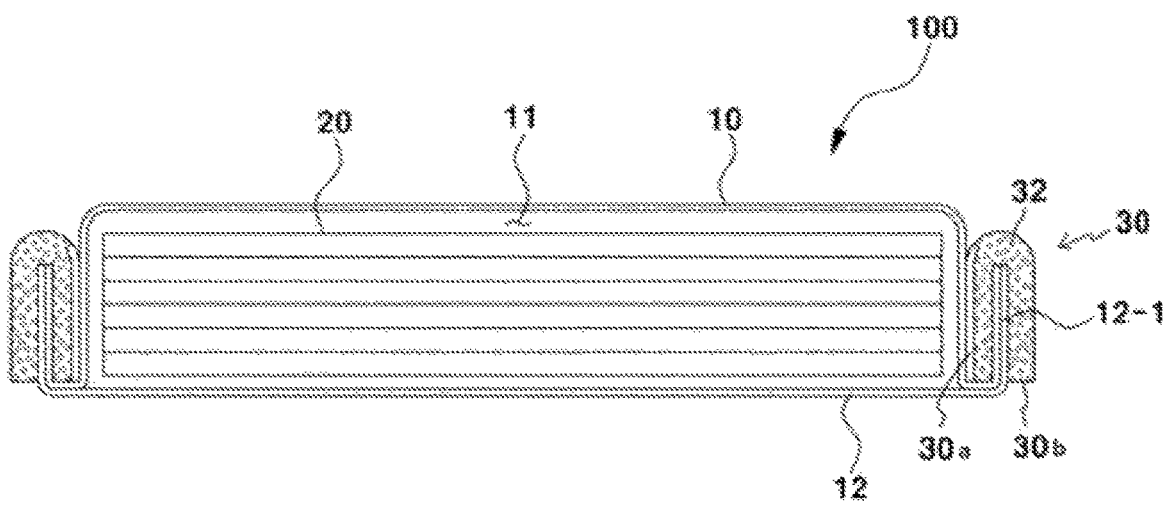

【Figure 4】
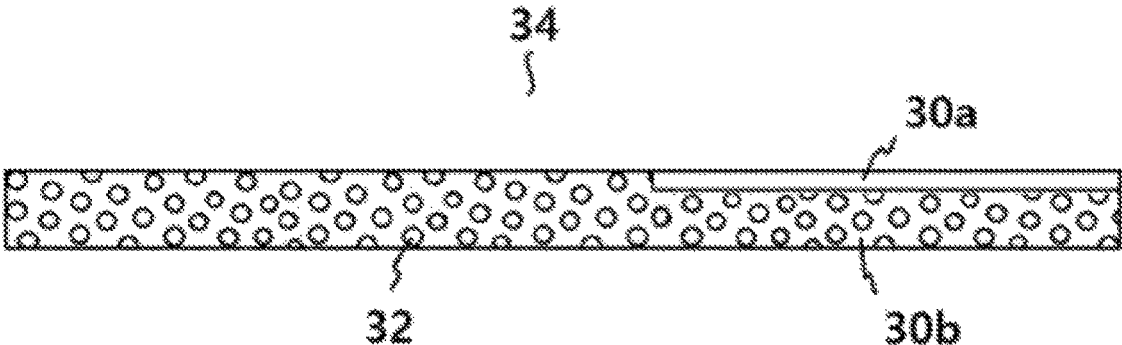
【Figure 5】
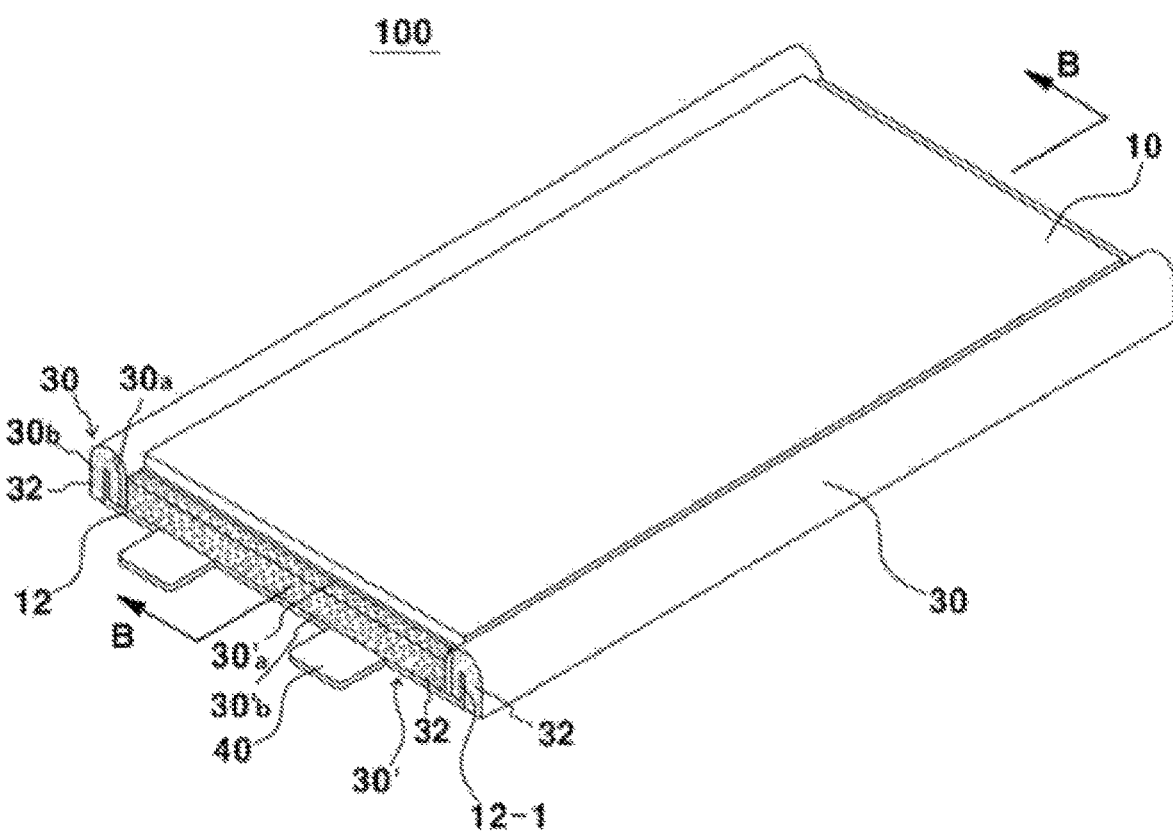

【Figure 6】
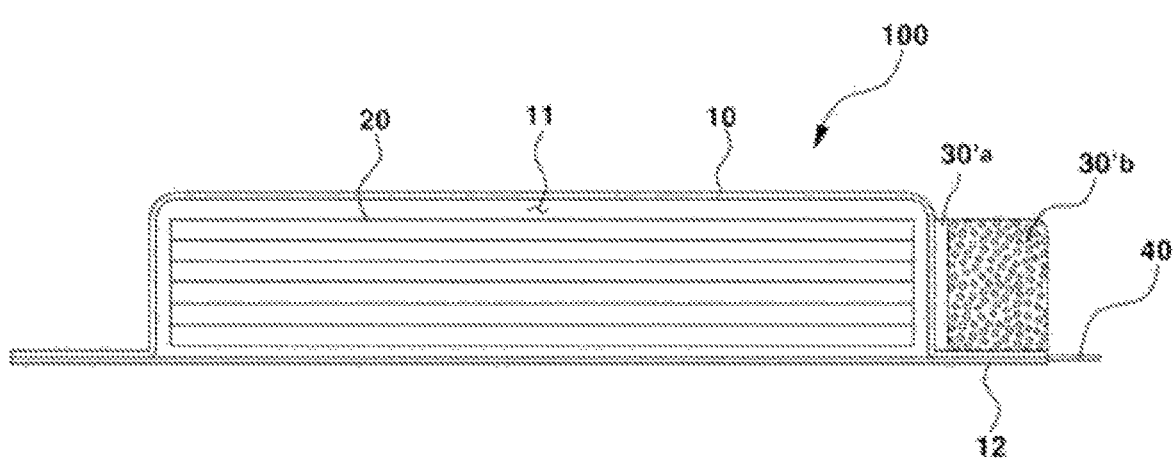
【Figure 7】
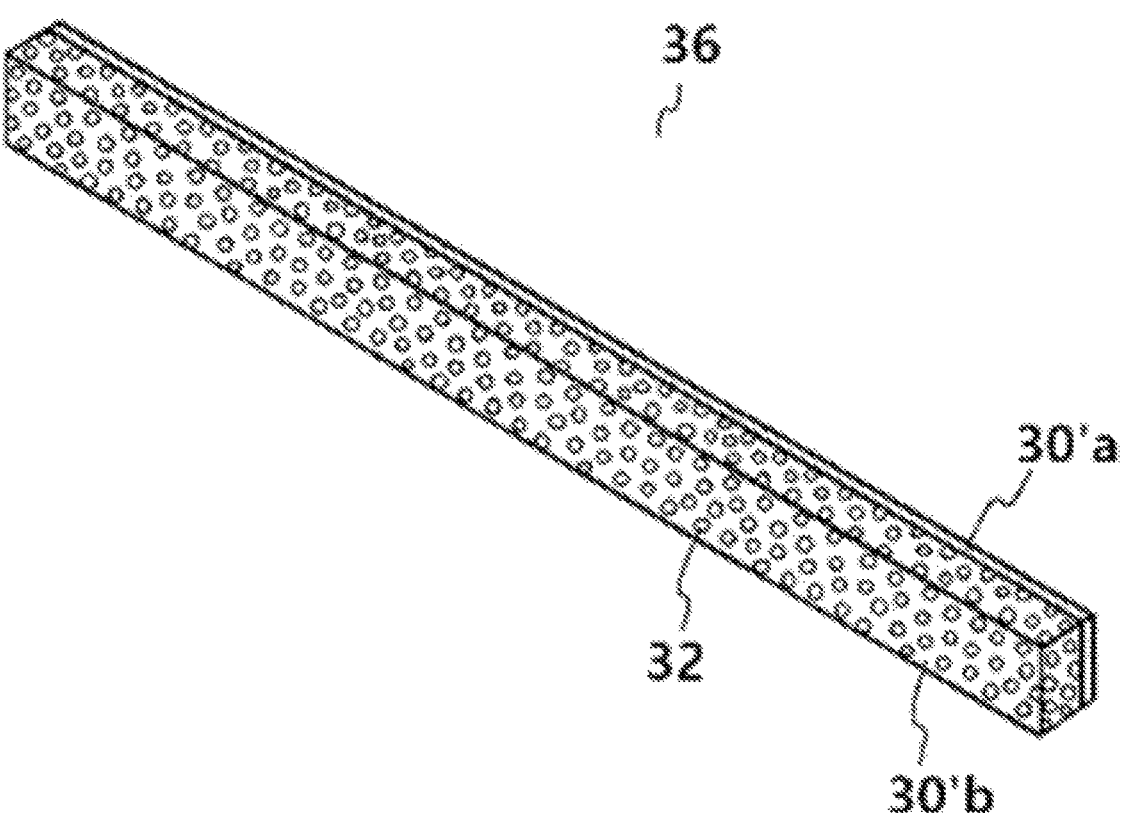

【Figure 8】
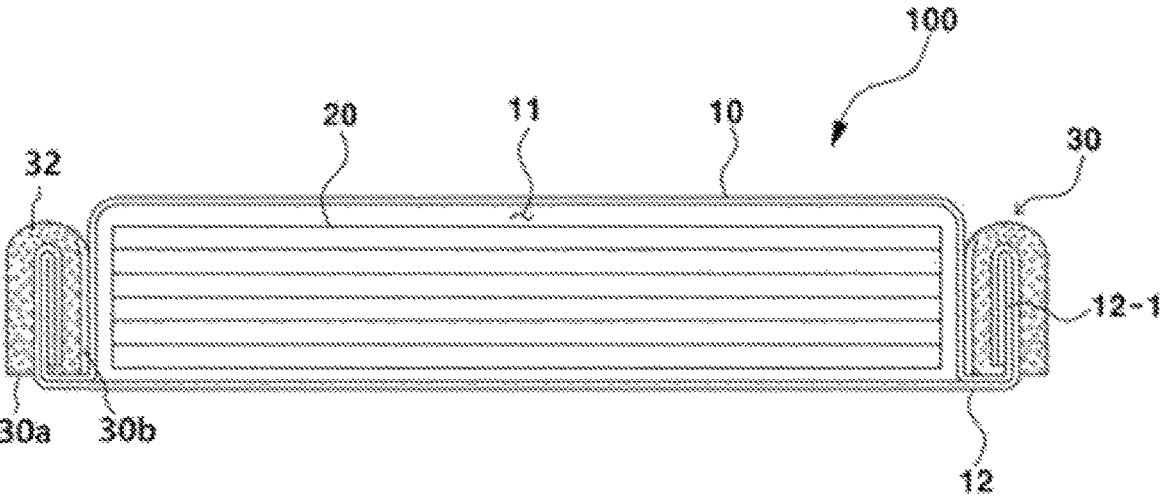
【Figure 9】
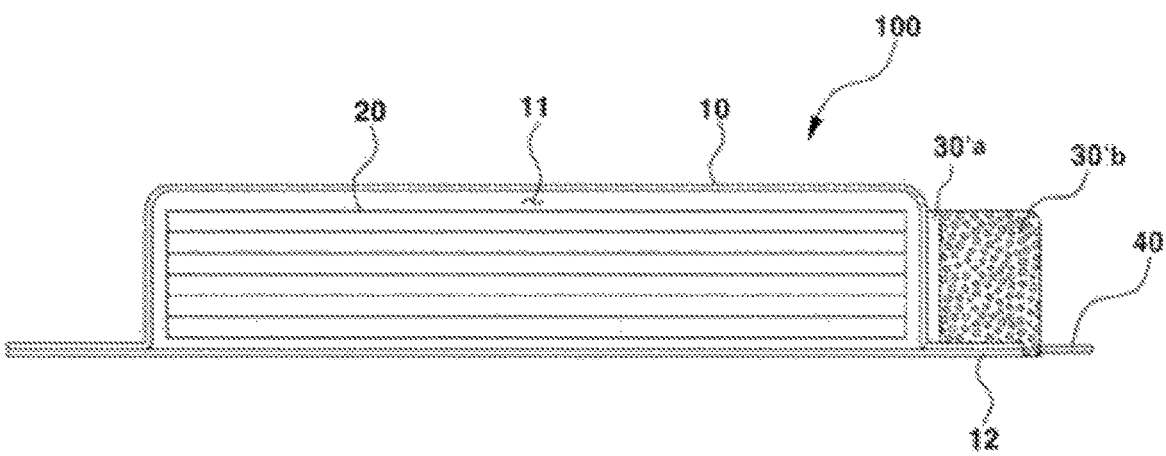
【Figure 10】
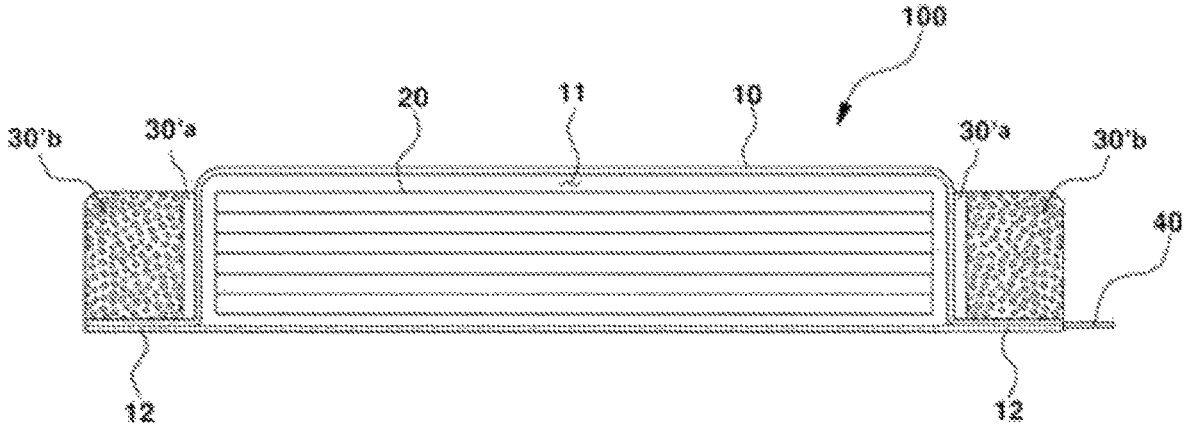

POUCH-TYPE SECONDARY BATTERY WITH EXCELLENT INSULATION AND HEAT-DISSIPATING PROPERTIES

CROSS-REFERENCE TO RELATED APPLICATIONS

The present application is a national phase entry under 35 U.S.C. § 371 of International Application No. PCT/KR2022/ 012497 filed on Aug. 22, 2022, which claims priority from Korean Patent Application Nos. 10-2021-0115869 filed on Aug. 31, 2021, and 10-2022-0088456 filed on Jul. 18, 2022, the entire contents of which are incorporated herein by reference.

TECHNICAL FIELD

The present invention relates to a pouch type secondary battery having excellent insulation and heat-dissipating properties.

BACKGROUND ART

In secondary batteries, which have increased in usage recently, there is a trend of increasing demand for rectangular secondary batteries and pouch type secondary batteries that can be applied to products such as mobile phones due to thin thickness in view of a shape of the battery. In terms of materials, there is an increasing demand for lithium secondary batteries such as lithium ion batteries and lithium ion polymer batteries, which have advantages such as high energy density, discharge voltage and output stability.

The secondary batteries may be classified depending on the structure forming an electrode assembly having an anode/separation membrane/cathode structure. Examples of such an electrode assembly include a jelly-roll (winding type) electrode assembly having a structure in which long sheet-like anodes and cathodes are wound with a separation membrane interposed therebetween, a stack type (laminated type) electrode assembly in which a large number of anodes and cathodes cut into units of a predetermined size are sequentially laminated with the separation film interposed therebetween, a stack/folding type electrode assembly having a structure in which bi-cells or full cells, in which a predetermined unit of anodes and cathodes are laminated with a separation film interposed therebetween, are wound with the separation film, and the like.

In recent years, a pouch type battery having a structure in which the stack type or the stack/folding type electrode assembly is incorporated into a pouch type battery case made of an aluminum laminated sheet has attracted much attention due to a low manufacturing ratio, a small weight, and easy shape deformation, and its usage has also gradually increase.

FIG. 1 shows a general structure of a typical pouch type secondary battery of the related art. Referring to FIG. 1, a pouch type secondary battery 100 includes an electrode assembly 20, an electrode tab 50 extending from the electrode assembly 20, and an electrode lead 40 welded to the electrode tab 50, and a battery case 10 that accommodates the electrode assembly 20. A lead insulation coating 60 is attached to a part of upper and lower surfaces of the electrode lead 40 to increase the degree of sealing with the battery case 10 and ensure an electrical insulating state at the same time.

Such a pouch type battery is manufactured in a manner of accommodating an electrode assembly in a laminated sheet, injecting an electrolytic solution, and sealing by heat-sealing or the like. In such a manufacturing process, there is a problem that a heat-sealing portion (sealing portion) may be contaminated in the electrolyte injection process, or a resin layer may protrude outward due to excessive melting and/or pressing of the innermost resin layer of the laminated sheet. Contamination of the sealing portion and external protrusion of the internal resin layer act as a cause of incomplete sealing state, and defects of the sealing portion cause serious problems such as permeation of moisture and leakage of electrolyte.

In addition, it is known that a pouch type battery causes a dielectric breakdown phenomenon due to exposure of a metal layer at the end of a laminated sheet that is a battery case.

In order to solve this problem, the related art has proposed a method of insulating the outsides of the heat-sealing portion using a PET label, a tape, and the like. However, when insulating the outside of the heat-sealing portion using a PET label, tape, or the like, it is known that the label and tape may peel off, and defects such as air bubbles and wrinkles may occur.

In recent years, a pouch type battery in which a sealing aid is applied to the outside of the heat-sealing portion to improve sealability has also been introduced. However, it is not easy to apply a sealing aid with a predetermined viscosity and fluidity to the outside of the heat-sealing portion on a thin vertical cross section. Since the sealing aid flows down in the process of curing after application and it is difficult to obtain the effect, it seems that it is difficult to apply it to the actual mass production process.

Therefore, there is a demand for development of a technology capable of improving the sealability of the heat-sealing portion, and reliably preventing the dielectric breakdown phenomenon, by solving the problems of the related art.

RELATED ART DOCUMENT

Patent Document

Korean Patent No. 10-1216422

DISCLOSURE

Technical Problem

The present invention was devised to solve the above problems of the related art.

An object of the present invention is to provide a pouch type secondary battery having improved sealability and insulation properties of a sealing portion.

Another object of the present invention is to provide a pouch type secondary battery in which the heat-dissipating properties of the sealing portion are improved.

Technical Solution

In order to achieve the above object, the present invention provides a pouch type secondary battery including:

a pouch type battery case including an electrode assembly housing portion and a sealing portion; and an electrode assembly housed in the housing portion, in which the sealing portion includes a bent portion formed by bending the sealing portion toward the electrode assembly housing portion, an insulation coating layer is bonded to an inner surface and an outer surface of the bent portion on the basis of the electrode assembly housing portion, and a bent portion end surface forming a boundary between the inner surface and the outer surface, an outer surface of the insulation coating layer bonded to the inner surface of the bent portion is bonded to an outer surface of a wall of the electrode assembly housing portion, and the insulation coating layer includes a binder and heat-dissipating particles having a thermal conductivity of 0.2 w/(mk) or more, and a joint portion bonded to the outer surface of the wall of the electrode assembly housing portion does not include the heat-dissipating particles.

In an embodiment of the present invention, the joint portion may have a thickness of 1 μm to 100 μm from the outer surface of the wall of the electrode assembly housing portion.

In an embodiment of the present invention, the insulation coating layer of the inner surface and the outer surface of the bent portion on the basis of the electrode assembly housing portion, and the bent portion end surface forming the boundary between the inner and outer surfaces may be formed by bending and bonding an insulation coating film.

In an embodiment of the present invention, the insulation coating film may be bonded by heat-sealing.

In an embodiment of the present invention, the sealing portion may further include a terrace portion positioned parallel to the upper surface or the lower surface of the electrode assembly housing portion, an insulation coating layer is further laminated in a space formed between the terrace portion and an outer surface of the wall of the electrode assembly housing portion, and the insulation coating layer includes a binder and heat-dissipating particles having a thermal conductivity of 0.2 W/(mk) or more, and a joint portion bonded to the outer surface of the wall of the electrode assembly housing portion does not include the heat-dissipating particles.

In an embodiment of the present invention, the joint portion may have a thickness of 1 μm to 100 μm from the outer surface of the wall of the electrode assembly housing portion.

In an embodiment of the present invention, a height of the insulation coating layer may be equal to or lower than a height of the wall of the electrode assembly housing portion.

In an embodiment of the invention, an electrode lead may be positioned at a tip of the terrace portion.

In an embodiment of the present invention, a portion of the insulation coating layer including heat-dissipating particles may include a binder of 10 to 90% by weight and heat-dissipating particles of 10 to 90% by weight.

In an embodiment of the present invention, the heat-dissipating particles may have an average particle size of 0.1 μm to 10 μm.

In an embodiment of the present invention, the bent portion may include a portion formed by folding and overlapping the sealing portion twice or more.

Advantageous Effects

The pouch type secondary battery of the present invention provides excellent sealing portion sealability, excellent insulation properties, and particularly excellent heat-dissipating properties.

Therefore, the pouch type secondary battery of the present invention provides an effect of remarkably improving the safety of the battery.

DESCRIPTION OF DRAWINGS

FIG. 1 is an exploded perspective view of a conventional pouch type secondary battery.

FIG. 2 is a perspective view schematically showing an embodiment of a pouch type secondary battery of the present invention.

FIG. 3 is a cross-sectional view of the pouch type secondary battery of FIG. 2 taken along section A-A.

FIG. 4 is a cross-sectional view schematically showing the form of an insulation coating film as an embodiment of the present invention.

FIG. 5 is a perspective view schematically showing an embodiment of a pouch type secondary battery of the present invention.

FIG. 6 is a cross-sectional view of the pouch type secondary battery of FIG. 5 taken along section B-B.

FIG. 7 is a perspective view schematically showing the form of an insulation coating bar as an embodiment of the present invention.

FIGS. 8 to 10 are cross-sectional views schematically showing an embodiment of the pouch type secondary battery of the present invention.

BEST MODE

Hereinafter, embodiments of the present invention will be described in detail with reference to the accompanying drawings so that those skilled in the art can easily implement the present invention. The present invention may, however, be embodied in many different forms and is not limited to the embodiments set forth herein. Similar parts are denoted by the same reference numerals throughout the specification.

When a certain component is referred to as being "connected to, provided or installed in" another component, it may be directly connected or installed to the other component, but it should be understood that other configurations may be present between them. On the other hand, when a certain component is referred to as being "directly connected to, provided, or installed in" another component, it should be understood that there are no other components between them. On the other hand, other expressions describing relationships between constituents, namely "on top" and "directly on top" or "between" and "right between" or "adjacent to" and "directly next to" should be interpreted in the same way.

FIG. 1 is an exploded perspective view of a conventional pouch type secondary battery that is also applied to the present invention, and FIGS. 2 and 5 are perspective views schematically showing an embodiment of the pouch type secondary battery of the present invention.

A pouch type secondary battery 100 of the present invention, as shown in FIGS. 1 and 2, includes a pouch type battery case 10 including an electrode assembly housing portion 11 and a sealing portion 12; and an electrode assembly 20 housed in the housing portion 11.

The sealing portion 12 includes a bent portion 12-1 formed by being bent toward the electrode assembly housing portion 11.

An insulation coating layer 30 is bonded to an inner surface and an outer surface of the bent portion 12-1 on the basis of the electrode assembly housing portion 11, and a bent portion end surface forming the boundary between the inner and outer surfaces.

The outer surface of the insulation coating layer 30 bonded to the inner surface of the bent portion 12-1 is bonded to the outer surface of the wall of the electrode assembly housing portion 11.

The insulation coating layer 30 includes a binder and heat-dissipating particles 32 having a thermal conductivity of 0.2 W/(mk) or more, and a joint portion 30a bonded to the outer surface of the electrode assembly housing portion does not include heat-dissipating particles 32.

Although efforts have also been made to improve the sealability and insulation properties of the sealing portion in the pouch type secondary batteries of the related art, the improvement in effect has been inadequate. The present invention is characterized in that sealing and insulation properties of the sealing portion are improved, and heat-dissipating properties are significantly improved. In particular, the insulating layer formed on the conventional sealing portion has a drawback that the adhesive strength to the pouch type battery case is insufficient due to the inclusion of heat-dissipating particles as a whole, and the adhesive state cannot be maintained for a long period of time. The present invention has technical features that solve the problems of the related art as described above.

The joint portion 30a may have a thickness of 1 μm to 100 μm, preferably 5 μm to 20 μm, from the outer surface of the wall of the electrode assembly housing portion 11. If the thickness of the joint portion 30a is less than 1 μm, the adhesive strength is lowered, and if it exceeds 100 μm, the heat-dissipating effect is lowered.

The insulation coating layer 30 of the inner surface and the outer surface of the bent portion 12-1 based on the electrode assembly housing portion 11, and the bent portion end surface forming the boundary between the inner and outer surfaces may be connected to each other.

The insulation coating layer 30 of the inner surface and the outer surface of the bent portion based on the electrode assembly housing portion 11, and the bent portion end surface forming the boundary between the inner and outer surfaces may be formed by bending and bonding the insulation coating film 34 as shown in FIG. 4. At this time, the bent portion of the insulation coating film 34 can be bonded so as to be located on the bent portion end surface forming the boundary between the inner surface and the outer surface.

Adhesion of the insulation coating film 34 can be performed by heat fusion.

In an embodiment of the present invention, the insulation coating film 34 may be manufactured in the form illustrated in FIG. 4. The insulation coating film 34 may be manufactured by, for example, preparing an insulation coating heat-dissipating composition containing a binder and heat-dissipating particles having a thermal conductivity of 0.2 W/(mk) or more, applying the heat-dissipating composition onto a substrate and curing the composition to form a first coating layer, then, partitioning the upper surface of the first coating layer, coating the insulation coating heat-dissipating composition in a part of the upper surface, and coating and curing the binder composition in another part. The insulation coating film 34 can be manufactured by a known extrusion (injection) method.

Also, the insulation coating film 34 may be manufactured by forming the first coating layer, then partitioning the upper surface of the first coating layer, and coating and curing the binder composition in only a part thereof (only the joint portion 30a). The insulation coating film 34 can also be manufactured by a known extrusion (injection) method.

In an embodiment of the present invention, the thickness of the insulation coating film 34 may be between 20 μm and 1 μm, preferably between 40 μm and 200 μm.

In an embodiment of the present invention, the sealing portion 12 further includes a terrace portion (non-bent portion) positioned in a direction parallel to the upper surface or the lower surface of the electrode assembly housing portion 11. At this time, as shown in FIGS. 5 and 6, an insulation coating layer 30' may be further laminated in the space formed between the terrace portion and the outer surface of the wall of the electrode assembly housing portion 11.

The insulation coating layer 30' includes a binder and heat-dissipating particles 32 having a thermal conductivity of 0.2 W/(mk) or more, and the joint portion 30'a bonded to the outer surface of the wall of the electrode assembly housing portion may have a form that does not include the heat-dissipating particles 32.

The joint portion 30'a may have a thickness of 1 μm to 100 μm, preferably 5 μm to 20 μm, from the outer surface of the wall of the electrode assembly housing portion 11. If the thickness of the joint portion 30'a is less than 1 μm, the adhesive strength is lowered, and if it exceeds 100 μm, the heat-dissipating effect is lowered.

The insulation coating layer 30' can be formed in a form suitable for the space formed between the terrace portion and the outer surface of the wall of the electrode assembly housing portion 11, and can be formed for example, in a form similar to a square column as shown in FIGS. 5 and 6 but is not limited thereto.

The insulation coating layer 30' can be formed using an insulation coating bar 36 as shown in FIG. 7. The insulation coating bar 36 may have a shape similar to a square column, but may have an appropriate shape depending on the shape of the pouch type battery case.

The insulation coating bar 36 can be bonded by heat fusion, or can also be bonded using another adhesive.

In an embodiment of the present invention, the insulation coating layer 30' can be formed only on the terrace portion in the direction in which the electrode lead 40 is located, or as shown in FIGS. 5 and 6, it may be formed on both the terrace portion in the direction in which the electrode lead 40 is located and the terrace portion on the opposite side thereof.

In an embodiment of the present invention, as shown in FIG. 9, an insulation coating layer 30' can be formed in the form of covering the tip of the terrace portion, and can also be formed in the form of covering the tip of the terrace portion and a part or all of the lower surface of the terrace portion.

In an embodiment of the present invention, the height of the insulation coating layer 30' may be the same as or lower than the height of the wall of the electrode assembly housing portion 11.

In an embodiment of the present invention, the electrode lead 40 can be placed at the tip of the terrace, as shown in FIGS. 5 and 6.

In an embodiment of the present invention, the portions 30b and 30'b including heat-dissipating particle in the insulation coating layers 30 and 30' can include the binder of 10 to 90% by weight and heat-dissipating particles of 10 to 90% by weight. Preferably, it may include the binder of 30 to 70% by weight and heat-dissipating particles of 30 to 70% by weight, more preferably the binder of 40 to 60% by weight and heat-dissipating particles of 40 to 60% by weight.

Furthermore, in addition to the above ingredients, it may further include known ingredients used for insulation coatings in this field.

If the heat-dissipating particles are less than 10% by weight, the heat-dissipating effect cannot be expected. If the heat-dissipating particles exceed 10% by weight, the adhesive strength of the insulation coating layers 30 and 30' may deteriorate, and thus is not preferable.

A photocurable polymer or a thermosetting polymer can be used as the binder. Polyurethane resin, polyethylene resin, polypropylene resin, polybutylene resin, polystyrene resin, polyethylene terephthalate resin, polycarbonate resin, polybutadiene resin, unsaturated polyester-based resin, polyimide-based resin, polyacrylate-based resin, and the like may be used alone or in the form of a mixture of two or more, but not limited thereto. Examples of the polyacrylate-based resin may include polyester acrylate, epoxy acrylate, urethane acrylate, or the like.

Examples of the heat-dissipating particles having a thermal conductivity of 0.2 W/(mk) or more include aluminum, carbon, copper, chromium, titanium, stainless steel particles, and the like, which may be used alone or in the combined form of two or more.

The heat-dissipating particles may have an average particle size of 0.1 μm to 10 μm, but are not limited to this range.

The heat-dissipating particles preferably have an electrical conductivity of 0.2 S/cm or less. If the conductivity is higher than the above range, the insulation properties may deteriorate, which is not preferable.

In an embodiment of the present invention, the joint portions 30a and, 30'a to the outer surface of the wall of the electrode assembly housing portion that do not include the heat-dissipating particles in the insulation coating layers 30 and 30' may include a binder and additives conventionally used to improve adhesive strength in this field, and may be made up of only the binders described above.

In an embodiment of the present invention, the sealing portion 12 includes a bent portion 12-1 formed by bending the sealing portion toward the electrode assembly housing portion, as shown in FIGS. 2, 3 and 8.

The bent portion 12-1 can be bent by 80 to 180 degrees, preferably 85 to 145 degrees, and more preferably 90 to 100 degrees on the basis of the non-bent portion of the sealing portion.

In an embodiment of the present invention, as shown in FIG. 8, the bent portion 12-1 can include a portion in which the sealing portion is folded and overlapped twice or more.

In an embodiment of the present invention, since the electrode assembly 20 can be of any form known in the art without limitation, and detailed description thereof will be omitted.

The electrode assembly 20 is not particularly limited as long as it has a structure in which a plurality of electrode tabs are connected to form a anode and a cathode, can have a stack/folding type structure or a lamination stack type structure.

Moreover, the battery case 10 is made of a laminated sheet including a metal layer and a resin layer, for example, an aluminum laminated sheet, and may be a pouch type case including an electrode assembly housing portion and a sealing portion.

The battery case 10 can be made of a single unit of laminated sheet, and in this case, a case main body portion including the electrode assembly housing portion around the bent portion, and a cover portion coupled to the case main body to wrap the electrode assembly housing portion can be formed.

A terrace portion having electrode terminals having a structure in which an electrode tab protruding from the electrode assembly and an electrode lead are coupled may be located at a portion facing the bent portion of the laminated sheet, and side surface sealing portions each adjacent to both end portions of the terrace portion may be located. A bent portion may be formed in the side surface sealing portion.

Example 1: Production of Insulation Coating Film polyurethane binder and an aluminum/carbon composite (particle size: 0.1 μm) as heat-dissipating particles with a thermal conductivity of 0.2 W/(mk) or more were added to an acetone solvent at a weight ratio of 1:9 to prepare an insulation coating heat-dissipating composition.

Further, a polyurethane binder was added to an acetone solvent to prepare an insulation coating binder composition.

The insulation coating heat-dissipating composition was applied to a substrate and cured to form a first coating layer.

Next, the upper surface of the first coating layer was partitioned according to the form of the insulation coating film shown in FIG. 4, and the portion to be bonded to the outer surface of the wall of the electrode assembly housing portion was coated with the insulation coating binder composition, and the remaining portion was coated with the insulation coating heat-dissipating composition and cured to prepare an insulation coating film as shown in FIG. 4.

Comparative Example 1: Production of Insulation Coating Film

The heat-dissipating composition for insulation coating prepared in Example 1 was applied to the same thickness as the insulation coating film prepared in Example 1 and cured to prepare an insulation coating film.

Example 2: Formation of Insulating Layer on Sealing Portion of Pouch Type Secondary Battery In the sealing portion of the pouch type battery case in which the electrode assembly was housed, a part on the side of the electrode assembly housing portion was left, and the remaining portion was bent 90 degrees toward the electrode assembly housing portion to form a bent portion. Thereafter, the insulation coating film prepared in Example 1 was folded and then heat-sealed to form an insulation coating layer as shown in FIG. 2.

Comparative Example 2: Formation of Insulating Layer on Sealing Portion of Pouch Type Secondary Battery An insulation coating layer was formed in the same manner as in Example 2, except that the insulation coating film prepared in Comparative Example 1 was used.

Test Example 1: Adhesion Performance Evaluation of Insulation Coating Layer

It was checked whether the insulation coating layer was detached while storing the pouch type secondary battery of Example 2 and Comparative Example 2 at a temperature of 65° C. or lower, and the results were shown in Table 1 below.

TABLE 1

|  | After 72 hours | After 360 hours |
| --- | --- | --- |
| Example 2 State of insulation coating layer of pouch type secondary battery | No abnormality | No abnormality |
| Comparative example 2 State of insulation coating layer of pouch type secondary battery | A gap is generated at a joint portion bonded to the outer surface of the wall of the electrode assembly housing portion, in the insulating coating layer. | 50% of the joint portion bonded to the outer surface of the wall of the electrode assembly housing portion is detached in the insulating coating layer. |

Although the present invention has been described with reference to limited embodiments and drawings, the present invention is not limited thereto, and also it is apparent that various modifications and variations can be made by those of ordinary skill in the art to which the present invention pertains within the scope of equivalents of the technical spirit of the present invention and the claims to be described below.

DESCRIPTION OF SYMBOL

10: Battery case, 11: Electrode assembly housing,
12: Sealing portion, 12-1: Bending portion,
20: Electrode assembly, 30, 30': Insulation coating layer,
30a, 30'a: Joint portions of insulation coating layer to outer surface of wall of electrode assembly housing portion,
30b, 30'b: Heat-dissipating particle including portion of insulation coating layer,
32: Heat-dissipating particles, 34: insulation coating film,
36: Insulation coating bar,
40: Electrode lead, 50: Electrode tap,
60: Lead insulation coating

The invention claimed is:

1. A pouch type secondary battery, comprising:
a pouch type battery case including an electrode assembly housing portion and a sealing portion; and
an electrode assembly housed in the housing portion,
wherein the sealing portion includes:
a bent portion formed by bending the sealing portion toward the housing portion, and
a first insulation coating layer is-bonded to an inner surface and an outer surface of the bent portion, and to an end surface of the bent portion extending between and connecting the inner surface and the outer surface of the bent portion,
wherein an outer surface of the first insulation coating layer bonded to the inner surface of the bent portion is bonded to an outer surface of a wall of the housing portion,
wherein
the first insulation coating layer includes:
a portion containing a first binder and first heat-dissipating particles having a thermal conductivity of 0.2 w/(mk) or more, and a first joint portion containing the first binder and not containing the first heat-dissipating particles,
wherein the first joint portion is bonded to the outer surface of the wall of the housing portion.

2. The pouch type secondary battery according to claim 1, wherein the first joint portion has a thickness of 1 μm to 100 μm from the outer surface of the wall of the housing portion.

3. The pouch type secondary battery according to claim 1, wherein the first insulation coating layer on the inner surface, the outer surface, and the end surface of the bent portion are connected to each other.

4. The pouch type secondary battery according to claim 3, wherein the first insulation coating layer is configured by bending and bonding an insulation coating film to the bent portion.

5. The pouch type secondary battery according to claim 4, wherein the insulation coating film is bonded by heat-sealing.

6. The pouch type secondary battery according to claim 1, wherein the sealing portion further includes a terrace portion positioned parallel to an upper surface or a lower surface of the housing portion,
a second insulation coating layer is further laminated in a space formed between the terrace portion and the outer surface of the wall of the housing portion, wherein
the second insulation coating layer includes: a portion containing a second binder and second heat-dissipating particles having a thermal conductivity of 0.2 W/(mk) or more, and a second joint portion containing the second binder and not containing the second heat-dissipating particles,
wherein the second joint portion is bonded to the outer surface of the wall of the housing portion.

7. The pouch type secondary battery according to claim 6, wherein the second joint portion has a thickness of 1 μm to 100 μm from the outer surface of the wall of the housing portion.

8. The pouch type secondary battery according to claim 6, wherein a height of the second insulation coating layer is equal to or less than a height of the wall of the housing portion.

9. The pouch type secondary battery according to claim 8, wherein an electrode lead is positioned at a tip of the terrace portion.

10. The pouch type secondary battery according to claim 6, wherein the portion containing the second binder and second heat-dissipating particles includes 10% to 90% by weight of the second binder and 10% to 90% by weight of the second heat-dissipating particles.

11. The pouch type secondary battery according to claim 10, wherein the second heat-dissipating particles have an average particle size ranging from 0.1 μm to 10 μm.

12. The pouch type secondary battery according to claim 1, wherein the bent portion includes a portion formed by folding and overlapping the sealing portion at least twice.

13. The pouch type secondary battery according to claim 1, wherein the portion containing the first binder and first heat-dissipating particles includes 10% to 90% by weight of the first binder and 10% to 90% by weight of the first heat-dissipating particles.

14. The pouch type secondary battery according to claim 13, wherein the first heat-dissipating particles have an average particle size ranging from 0.1 μm to 10 μm.

* * * * *